March 2, 1971 M. CARBONEL 3,566,461

METHOD OF MAKING A MAGNETIC CIRCUIT ELEMENT

Filed July 2, 1968 6 Sheets-Sheet 1

March 2, 1971 M. CARBONEL 3,566,461

METHOD OF MAKING A MAGNETIC CIRCUIT ELEMENT

Filed July 2, 1968 6 Sheets-Sheet 2

3,566,461

METHOD OF MAKING A MAGNETIC CIRCUIT ELEMENT

Michel Carbonel, Paris, France, assignor to CSF-Compagnie Generale de Telegraphie Sans Fil
Filed July 2, 1968, Ser. No. 742,087
Claims priority, application France, July 4, 1967, 113,054
Int. Cl. H01f 7/06
U.S. Cl. 29—604 10 Claims

ABSTRACT OF THE DISCLOSURE

A method for manufacturing integrated circuit elements, including a ferromagnetic plate with an aperture through which extend the associated conductors, comprises essentially the steps of depositing copper on the two sides of the plate, forming holes in the sandwich thus obtained, electrodepositing, with the copper as an anode, a conductor along a pattern alternately extending on the two sides of the said plate, and through said holes; forming the aperture in the plate; removing the remaining copper and inserting between the plate and the conductor an insulating material.

The present invention relates to a novel method of manufacturing integrated circuits and more particularly integrated magnetic circuits; it also relates to the circuits thus obtained.

In magnetic memory techniques, it may be necessary to produce one or more conductors which pass through small-sized holes formed in very large number in a metal surface without mechanical or electrical contact between them and with the wall of the hole.

According to the invention, there is provided a method for manufacturing integrated magnetic circuit elements, including a plate of ferromagnetic material and at least one conductor extending through said plate, comprising the following steps: depositing a conductive material on both sides of said plate, thus forming a sandwich; forming holes in said sandwich; electroplating said material with a conductive metal along a predetermined pattern including the walls of said holes, thus forming said conductor; forming apertures in said ferromagnetic material around said walls, and inserting insulating material, between said conductors and said plate.

For a better understanding of the invention and to show how the same may be carried into effect reference will be made to the drawing appended to ensuing description and in which:

FIG. 1 schematically illustrates an example of a matrix made up of magnetic circuits such as these obtained by the method according to the invention;

FIG. 1*a* is a view in perspective on an enlarged scale, of an arrangement of three conductors passing through a single aperture achieved in accordance with the invention;

Figure 1:
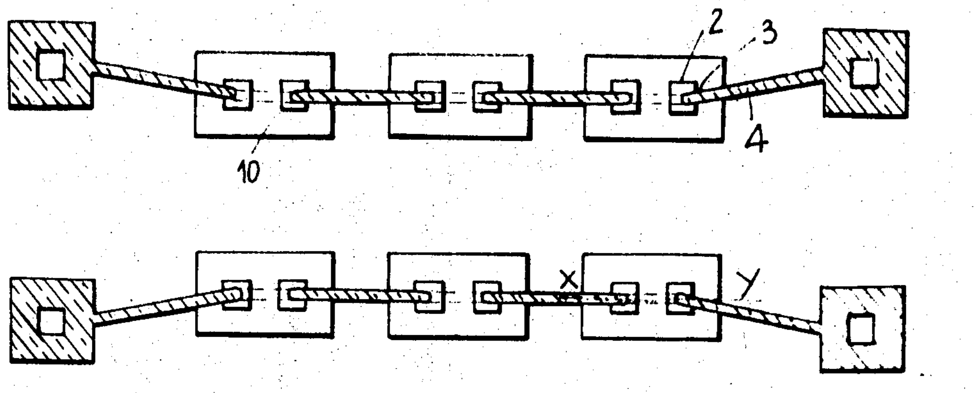

FIG. 1 illustrates two rows of a matrix formed of magnetic circuits 10. Each circuit is in the form of a magnetic plate with two holes 2, for example rectangular, as shown. Of course, circuits 10 need not be separate plates and a single plate with rows of holes 1 and 2 is used. It is an object of the invention to provide improved circuits of this type.

Figure 1A:
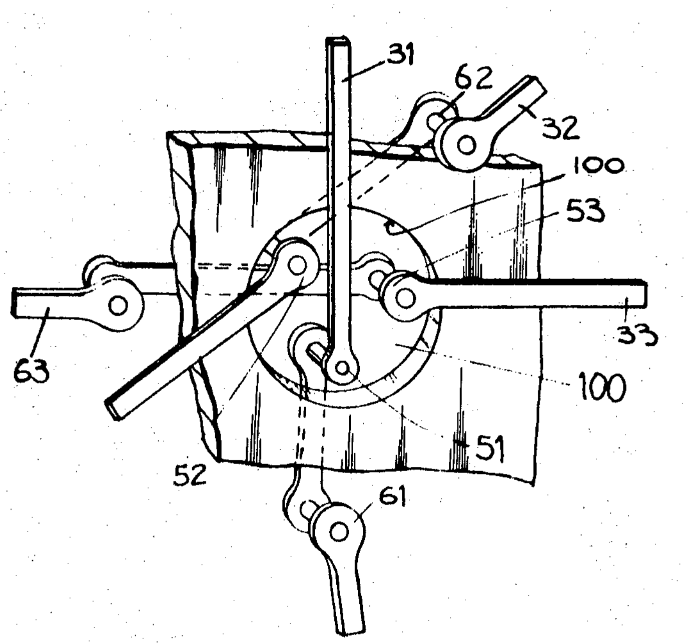

FIG. 1*a* illustrates, on a very much enlarged scale, one of the holes of a circuit of the type of that shown in FIG. 1, this hole being circular. Three conductors 31, 32 and 33 extend through the hole by means of respective connections 51, 52 and 53. Three other connections 61, 62, 63 are also provided, and their purpose will be described hereinafter.

The configuration produced may be even more complex than that shown in FIG. 1*a* and it will be realized that it would be difficult to produce a memory of this sort by ordinary mechanical or electrical techniques.

The invention provides a means of so doing. The successive stages of manufacture are illustrated in the following figures.

Figure 3:
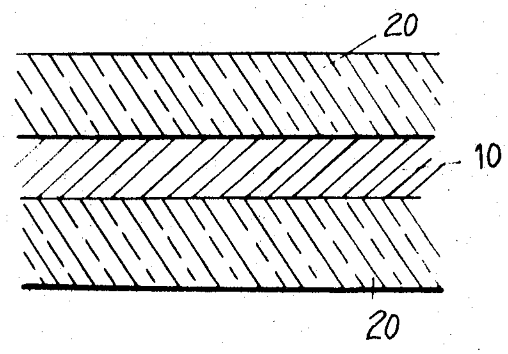
FIGS. 3 to 9 illustrate different steps of the method according to the invention.

FIG. 3 illustrates in section a sheet or foil 10 of ferromagnetic material, sandwiched between two copper sheets 20. The thickness of the foil 10 may be taken by way of non-limitative example to be between 12.5/$\mu$ and 20/$\mu$; the copper is deposited by electrolysis or by any other suitable process.

Figure 5:
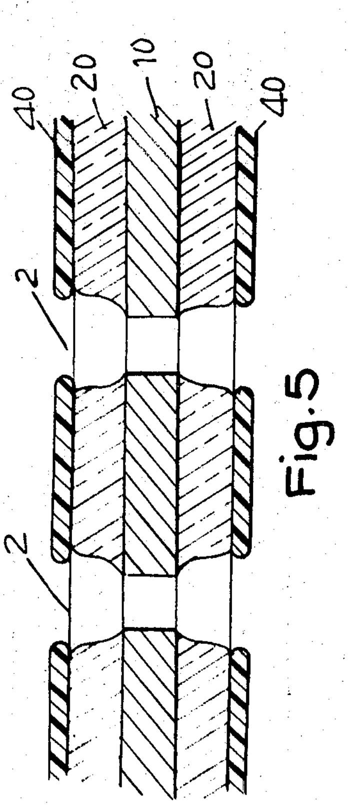
Figure 4:
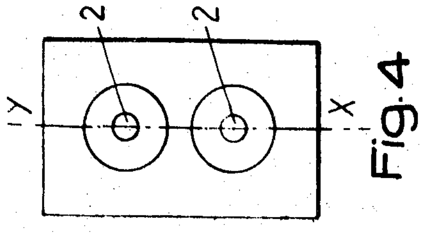

FIGS. 4 and 5, the latter being a section of the former on a larger scale, taken along the line X–Y, show the plate of FIG. 3. The two faces of the sandwich structure have been covered with a layer 40 of photosensitive resin. Holes 2 are then formed by photoengraving and etching as well known in the art.

The holes are circular in cross-section and the sectional illustration shows them to have an axial profile of double-tapered form, this being a consequence of the fact that the copper 20 is more readily etched away than the ferromagnetic metal 10.

Figure 7:
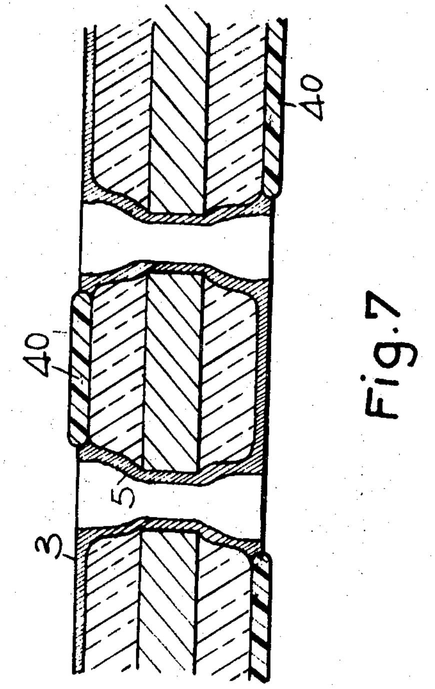
Figure 6:
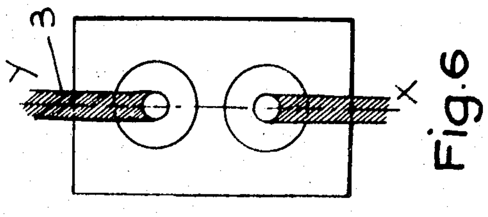

The assembly (FIGS. 6 and 7) is again treated, using a suitable photosensitive resin mask, in such a manner that layers of copper 20 are laid bare alternately, with respect to the hole 2 at one and the other side of the plate. Subsequently electrolysis is used to deposit upon the copper serving as an anode, the gold strips 3, which are connected to each other by ducts 5 formed by the fold deposited in the holes 2. The gold deposit will have a thickness of for example 10/$\mu$. This produces the final conductor.

Figure 8:
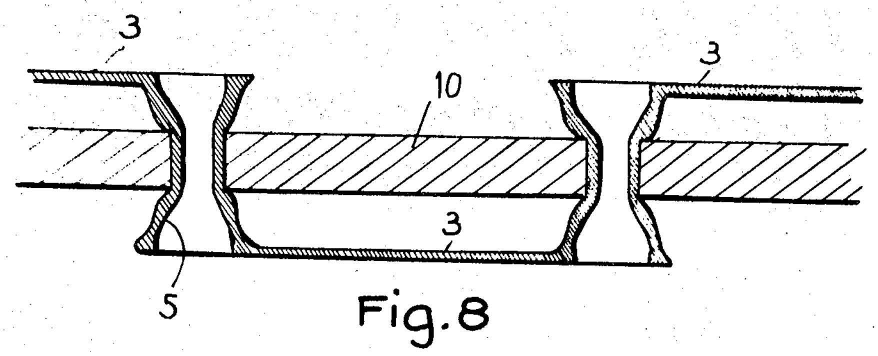

The next step is to remove the copper in order to prevent short-circuiting. In FIG. 8, photosensitive resin and copper have been dissolved and nothing remains but the conductors 3 and 5 and the plate 10.

Figure 9:
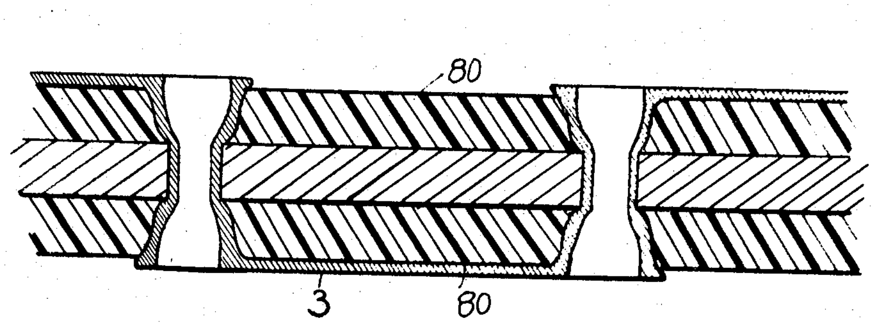

In FIG. 9, the assembly is mechanically reinforced by the addition of photosensitive resin 80 at the locations indicated. This resin, because of its fluidity, flows into the interstices. The resin is a positive one, i.e. it is made soluble by insolation and remains only at nonexposed locations.

Figure 2:
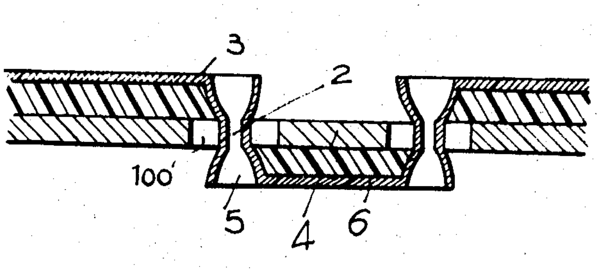
FIG. 2 illustrates in section along X–Y a portion of the structure shown in FIG. 1, formed in accordance with the invention.

Two or more conductors may be made to extend through the electromagnetic plate in the vicinity of each other and once this has been made, a single hole through which the conductors extend, as shown in FIG. 1*a*, is formed. To this end, using an appropriate mask, the assembly is exposed at the location of the holes 100 (FIG. 1*a*) which are to be produced by etching in the magnetic circuit, and ultimate arrangement, shown in FIG. 2 is then obtained.

A few modifications of the method according to the invention will now be described.

Modification 1

During the second stage of manufacture, it has been found that the holes formed in the sandwich structure by an etching agent, which simultaneously attacks the copper and magnetic metal, have a flared form, this because the copper is more readily attacked than the magnetic alloy and is submitted for a longer time to the action of the etching agent (ferric chloride). As a consequence, the eyelets 5 extending through the plate have a double-tapered form with a base diameter which may be equal to twice the thickness of the sandwich structure.

Figure 10:
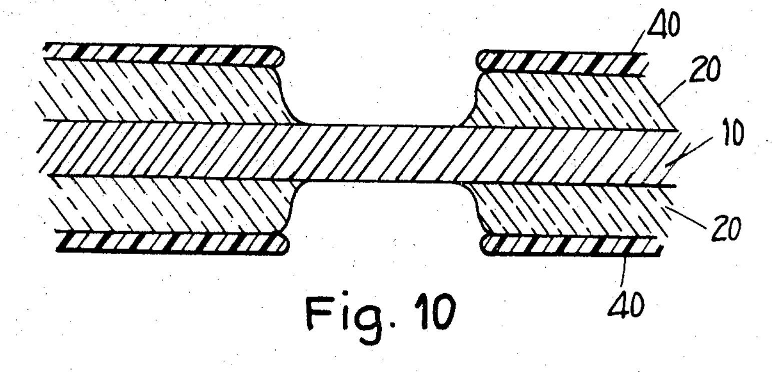
FIGS. 10 to 15 illustrate modifications of the invention.
Figure 11:
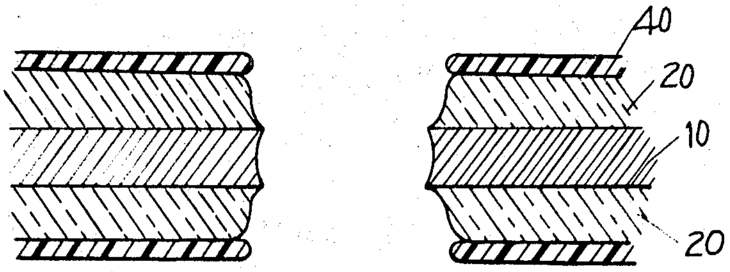

The present modification consists in carrying out the operation of etching the sandwich structure in two phases, in the course of the first of which (FIG. 10) only copper is etched (ferric chloride), while in the course of the second (FIG. 11) only the magnetic metal is etched (sulphuric acid or the like), the copper being untouched at this time. With this kind of approach, the hole produced has a cylindrical form and the diameter of the eyelet does not exceed the thickness of the sandwich structure, enabling a larger number of loops to be accommodated in a given space.

Modification 2

In this modification, the holes 100 are preformed in the plate 10. The plate is then entirely covered with copper 200. The arrangement thus produced is then treated as in the first case, until the introduction of the resin 80 (FIG. 2). This resin need not be photosensitive. It moves to the desired locations by capillary action.

The copper may also be dissolved in two phases. The residual areas of copper, left after the first phase, serve to locate the conductors whilst the uncoppered areas are fixed using insulating resin, and vice versa during the second phase. The resin may have a certain degree of elasticity, so that no stresses are developed.

Modification 3

According to this modification of the method according to the invention, the holes are also preformed in the magnetic material in their final shape. This means greater precision and enables holes which are two times smaller to be used. Holes, through which the ducts 61, 62, 63 extend, as shown in FIG. 1*a*, are formed during the manufacturing of the circuits.

These latter holes allow the wire to pass from one side of the magnetic circuit to the other, but are located outside of the magnetic circuit. Thus, there are preformed passages of type (a) passing through the circuit and of type (b) serving as mechanical supports.

The method carried out is as follows:

(1) The magnetic plate 100 has its final holes preformed.

Figure 12:
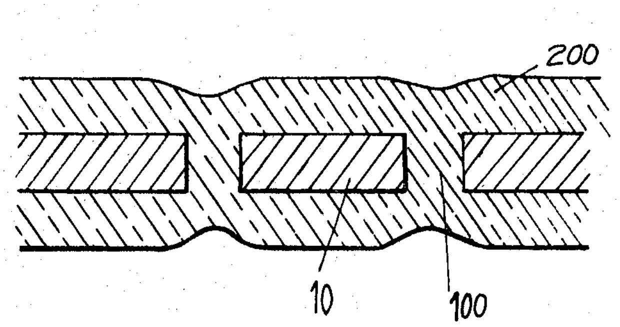

(2) The plate 100 is covered on both faces and inside the holes by two electrolytically deposited layers of copper 200 which also fills the preformed holes, as in the modification 2 (FIG. 12).

(3) In the resultant structure holes of type (b) are formed as explained above (FIG. 13).

(4) In the same manner as above, conductors 300 are formed.

Figure 13:
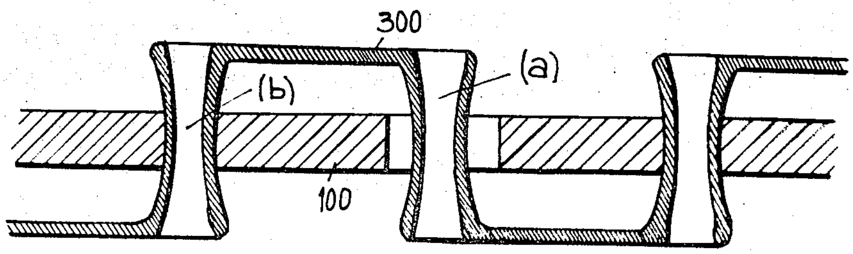
Figure 14:
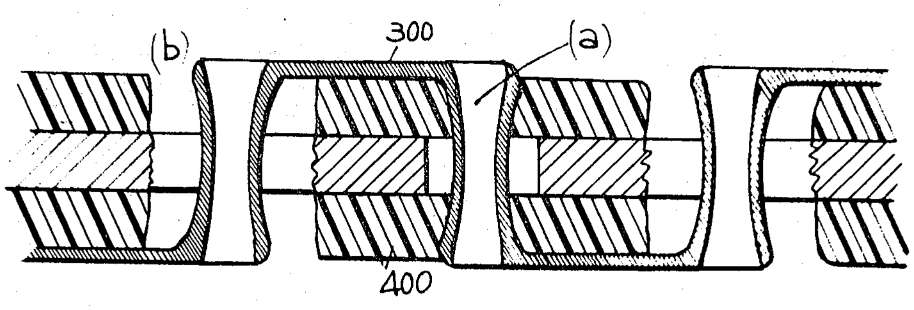

(5) After elimination of copper, the assembly has the appearance shown in FIG. 13; the passages (b) serve as an anchorage, the conductors (a) being thus accurately located.

(6) The operation is completed by the application of a fresh layer 400 of photosensitive resin and the holes are formed around conductors (b).

Modification 4

This modification is an improvement aimed at forming the holes in the magnetic metal with a greater precision, either in their final size or in the course of an intermediate stage of preparation for the passage of the conductors.

Figure 15:
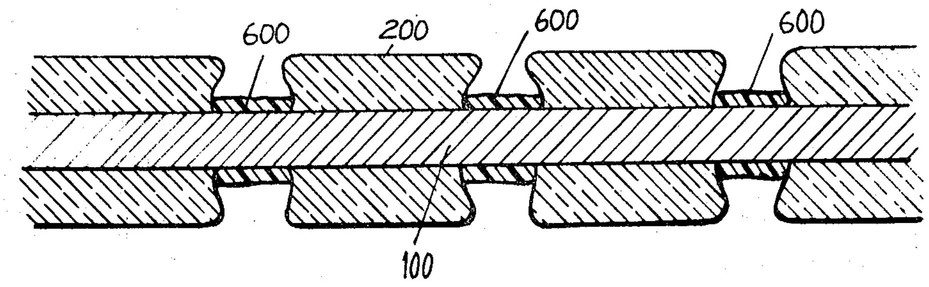

It consists in depositing capsules of resin 600 (FIG. 15) by photoengraving techniques at the location of the future areas to be cut-out from the magnetic metal 100. Then, the metal 200 is electrolytically deposited and because of the presence of the insulating capsules 600, chimneys are formed on the capsules. After dissolving the capsules, holes are formed in the plate.

Of course the invention is not limited to the embodiments described and shown which were given solely by way of example.

What is claimed is:

1. A method for manufacturing integrated magnetic circuit elements, including a plate of ferromagnetic material and at least one conductor extending through said plate, comprising the following steps: depositing a conductive material on both sides of said plate, thus forming a sandwich; forming holes in said sandwich; electroplating said conductive material with a conductive metal along a predetermined pattern including the walls of said holes, thus forming said conductor; forming apertures in said ferromagnetic material around said walls, removing said conductive material and inserting insulating material, between said conductor and said plate.

2. A method as claimed in claim 1, wherein said conductive material is copper and said conductive metal is gold.

3. A method as claimed in claim 1, wherein the steps of forming said holes and said pattern comprise depositing two layers of photosensitive resin on the faces of said sandwich, photoengraving said resin and etching said sandwich to form said holes.

4. A method as claimed in claim 3, wherein the step of etching comprises etching said copper with a first etching agent and etching said ferromagnetic material with a second etching agent.

5. A method as claimed in claim 1, wherein said pattern defines conductors connecting said holes alternately on the two sides of said sandwich.

6. A method as claimed in claim 5, wherein said pattern comprises further holes outside said apertures.

7. A method as claimed in claim 1, wherein said insulating material is a photosensitive resin.

8. A method as claimed in claim 7, wherein the step of forming said aperture comprises the step of inserting said photosensitive resin by capillarity between said ferromagnetic material and said conductors, treating said photosensitive resin, and etching said ferromagnetic material.

9. A method as claimed in claim 1, comprising the preliminary step of preforming said apertures in said plate.

10. A method as claimed in claim 1, further comprising the preliminary step of depositing capsules of resin at the location of said holes.

References Cited

UNITED STATES PATENTS

| | | | |
|---|---|---|---|
| 2,942,240 | 6/1960 | Rajchman et al. | 340—174 |
| 3,407,492 | 10/1968 | Davis | 29—604 |
| 3,429,038 | 2/1969 | Dugan et al. | 29—625 |

JOHN F. CAMPBELL, Primary Examiner

C. E. HALL, Assistant Examiner

U.S. Cl. X.R.

29—625; 174—68.5; 340—174